US008835764B2

(12) United States Patent
Seff et al.

(10) Patent No.: US 8,835,764 B2
(45) Date of Patent: Sep. 16, 2014

(54) UNIVERSAL RECEPTACLE FACEPLATE ASSEMBLY

(75) Inventors: Paul David Seff, Williamsburg, VA (US); Alston Gareth Brooks, Grafton, VA (US); Steven Christopher Saad, Willamsburg, VA (US)

(73) Assignee: Eaton Corporation, Cleveland, OH (US)

( * ) Notice: Subject to any disclaimer, the term of this patent is extended or adjusted under 35 U.S.C. 154(b) by 16 days.

(21) Appl. No.: 13/550,764

(22) Filed: Jul. 17, 2012

(65) Prior Publication Data

US 2014/0020925 A1   Jan. 23, 2014

(51) Int. Cl.
  *H02G 3/14*   (2006.01)
  *H02G 3/04*   (2006.01)

(52) U.S. Cl.
  CPC .............. *H02G 3/14* (2013.01); *H02G 3/0493* (2013.01)
  USPC ................. 174/67; 174/66; 174/53; 220/241; 220/242; 220/3.2

(58) Field of Classification Search
  USPC ........ 174/50, 53, 57, 58, 66, 67; 220/3.2, 3.3, 220/3.8, 241, 242
  See application file for complete search history.

(56) References Cited

U.S. PATENT DOCUMENTS

| | | | | |
|---|---|---|---|---|
| 4,733,330 A | * | 3/1988 | Tanaka et al. | 174/66 |
| 5,667,059 A | * | 9/1997 | Lee | 174/53 |
| 5,744,750 A | * | 4/1998 | Almond | 174/66 |
| 6,441,304 B1 | * | 8/2002 | Currier et al. | 174/53 |
| 6,750,398 B1 | | 6/2004 | Richardson | |
| 7,271,338 B1 | | 9/2007 | Rohmer | |
| 7,425,681 B2 | * | 9/2008 | Xu et al. | 174/66 |
| 7,642,458 B2 | * | 1/2010 | Stockton | 174/53 |
| 7,683,257 B1 | * | 3/2010 | Shotey et al. | 174/66 |
| 2003/0168237 A1 | | 9/2003 | Wengrower | |
| 2005/0257951 A1 | | 11/2005 | Xu et al. | |
| 2009/0283291 A1 | | 11/2009 | Ni | |

FOREIGN PATENT DOCUMENTS

WO    2005/115111 A2    12/2005

OTHER PUBLICATIONS

European Patent Office, "International Search Report and Written Opinion", Oct. 18, 2013, 10 pages.

* cited by examiner

*Primary Examiner* — Angel R Estrada
(74) *Attorney, Agent, or Firm* — Eckert Seamans Cherin & Mellott, LLC; John P. Powers

(57) ABSTRACT

Systems and other embodiments associated with a universal faceplate assembly are described. According to one embodiment, a faceplate includes a substantially planar plate base configured to mount on a wiring enclosure. At least one opening in the plate base is configured receive a receptacle. The opening is configured to receive receptacles of a first receptacle type or a second receptacle type. The faceplate also includes a faceplate notch in a front surface of the plate base configured to receive a receptacle tab. The receptacle tab is disposed on receptacles of the first receptacle type or the second receptacle type. The receptacle tab is configured to allow a fastener to pass through the faceplate notch and the receptacle tab to attach the receptacle to the faceplate.

20 Claims, 5 Drawing Sheets

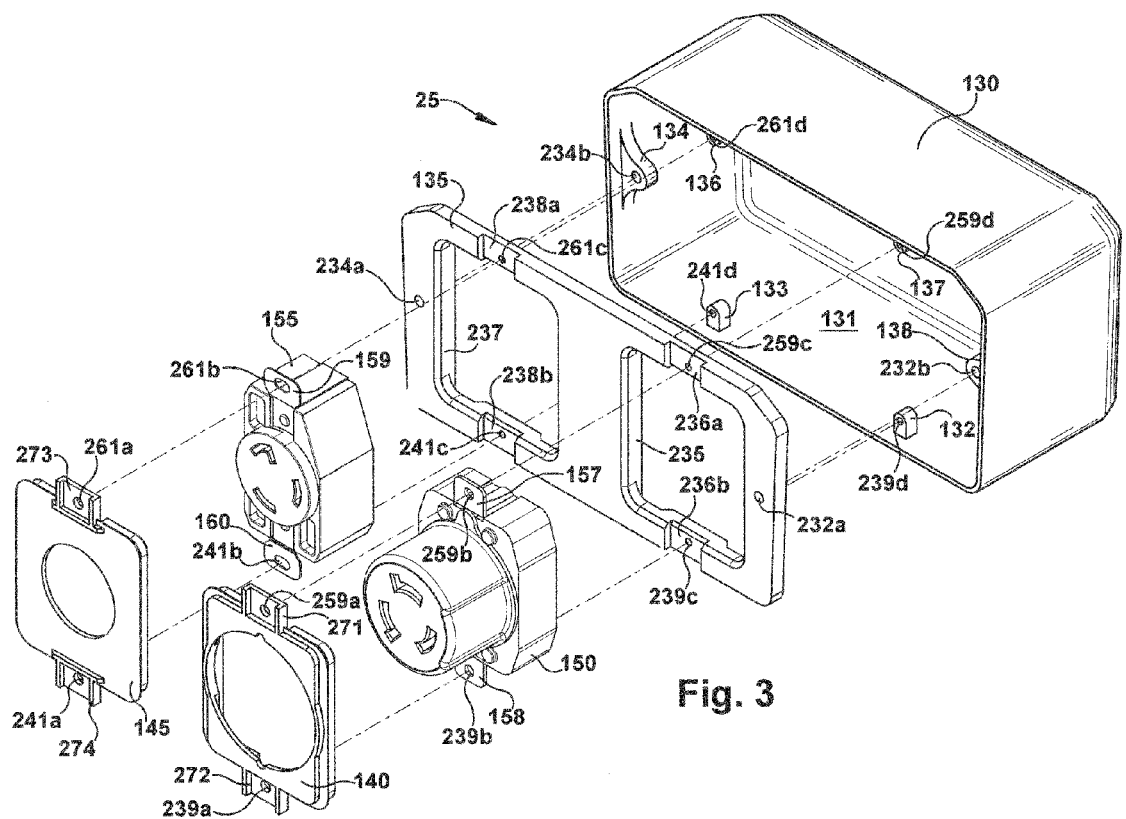

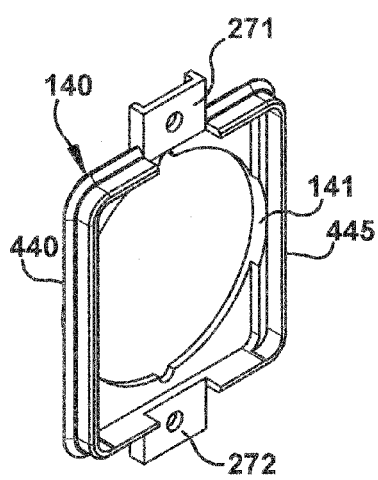
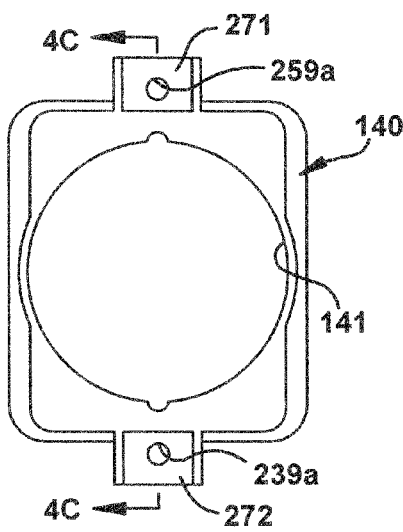
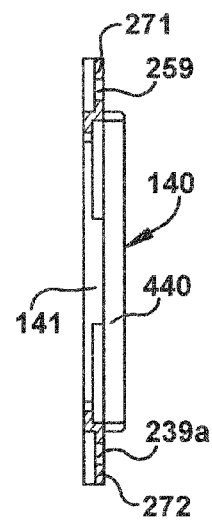
Fig. 4A  Fig. 4B  Fig. 4C
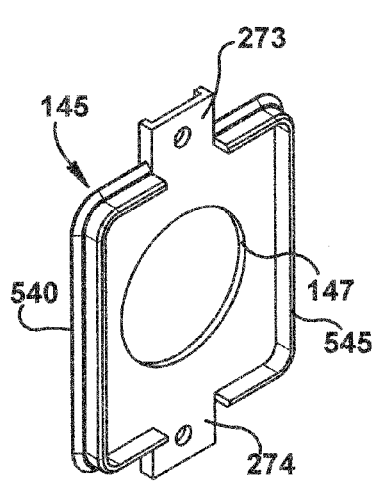
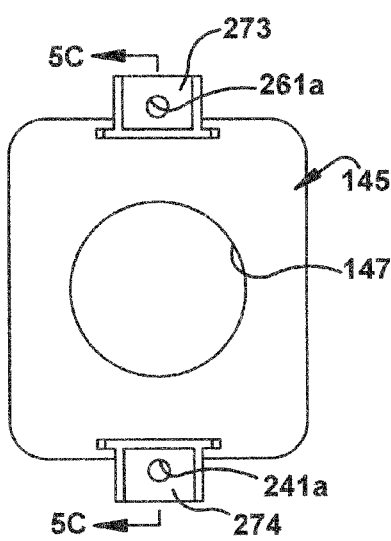
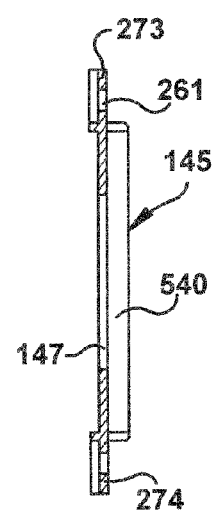
Fig. 5A  Fig. 5B  Fig. 5C

UNIVERSAL RECEPTACLE FACEPLATE ASSEMBLY

BACKGROUND

Marine power pedestals provide access to utilities, such as electrical power, to docked marine vessels. Standard marine power pedestals have hard wired electrical receptacles of specific amperage. Typical amperages provided by a marine pedestal include 20 A service, 30 A service, and 50 A service. Each type of receptacle has its own configuration. Because the receptacles are not intended to be changed, the casing of the marine power pedestal encloses the electric receptacles. This limits the amperage of the receptacles to the amperage of the receptacles originally installed, despite vessels using the docking facilities having different amperage requirements and needs. The power pedestals may include special mounting features for the specific types of receptacles that are to be installed in the pedestal. The receptacles are protected by covers that are molded with the casing. The covers are designed based on the dimensions of the hardwired electrical receptacles.

SUMMARY

In one embodiment, a faceplate includes a substantially planar plate base configured to mount on a wiring enclosure. At least one opening in the plate base is configured receive a receptacle. The opening is configured to receive receptacles of a first receptacle type or a second receptacle type. The faceplate also includes a faceplate notch in a front surface of the plate base configured to receive a receptacle tab. The receptacle tab is disposed on receptacles of the first receptacle type or the second receptacle type. The receptacle tab is configured to allow a fastener to pass through the faceplate notch and the receptacle tab to attach the receptacle to the faceplate.

In one embodiment, an electrical enclosure assembly includes an enclosure configured to house one more receptacles and associated wiring. The electrical enclosure assembly also includes a faceplate having a plate base with a front surface and at least one opening configured receive a receptacle and a faceplate notch. The faceplate notch has a faceplate notch hole, and the faceplate notch is configured to align with a receptacle tab disposed on the receptacle. The receptacle tab has a receptacle hole. The electrical enclosure assembly also includes a cover having a cover tab with a cover hole. The cover is configured to be seated over the receptacle. The electrical enclosure assembly further includes a fastener configured to couple the faceplate, the receptacle, the enclosure, and the cover by passing through the faceplate notch hole, the receptacle tab, the enclosure tab, and the cover tab.

In one embodiment a universal receptacle faceplate assembly kit is described. The universal receptacle faceplate assembly kit includes a faceplate. The faceplate includes a substantially planar plate base configured to mount on a wiring enclosure and at least one opening in the plate base. The at least one opening is configured receive a receptacle of a first receptacle type or a second receptacle type. The faceplate also includes a faceplate notch in a front surface of the plate base configured to receive a receptacle tab disposed on receptacles of the first receptacle type or the second receptacle type.

The universal receptacle faceplate assembly kit also includes a set of covers. A cover includes a cover tab. The cover is configured to surround a receptacle of a selected receptacle type. The universal receptacle faceplate assembly kit further includes a fastener configured to couple the faceplate, a receptacle, and the cover by passing through the faceplate notch, the receptacle tab, and the cover tab.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 3 is an exploded view of one embodiment of a universal receptacle faceplate assembly.

FIG. 4A is a perspective view of one embodiment of a faceplate cover.

FIG. 4B is a front view of one embodiment of a faceplate cover.

FIG. 4C is a cross section view of one embodiment of a faceplate cover.

FIG. 5A is a perspective view of one embodiment of a faceplate cover.

FIG. 5B is a front view of one embodiment of a faceplate cover.

FIG. 5C is a cross section view of one embodiment of a faceplate cover.

DETAILED DESCRIPTION

The universal receptacle faceplate assembly described herein allows receptacles of different configurations to be installed on the same faceplate. This simplifies the assembly of the power pedestal and makes changing the amperage of the power pedestal less difficult. Accordingly, the receptacles can be changed to accommodate changing power needs. The universal receptacle faceplate assembly is configured to fit receptacles of various sizes and shapes. The universal receptacle faceplate assembly is designed to be used in a marine context, such as in a power pedestal. However, the universal faceplate assembly may be used in a multitude of environments (e.g., home and building, recreational vehicle park, and so on).

The universal receptacle faceplate assembly described herein includes an enclosure configured to house at least one receptacle and its associated wiring. The enclosure is fitted with a faceplate that is removable. The faceplate has openings sized to hold receptacles of several configurations (e.g., 20 A, 30 A, 50 A). Accordingly, even if the receptacles are changed the faceplate does not have to be changed. A cover corresponding to the opening of the faceplate is affixed around the receptacle to protect the installed receptacle configuration. The enclosure, faceplate, receptacles, and cover are assembled using a series of tabs, notches, and holes designed to fit together.

Figure 1A:
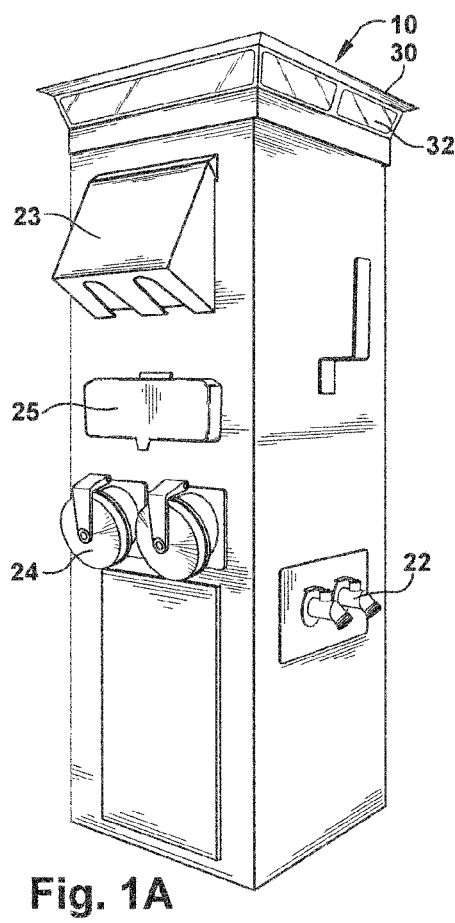
FIG. 1A is a schematic illustration of a marina power pedestal that includes one embodiment of a universal receptacle faceplate assembly.

FIG. 1A illustrates an embodiment of a power pedestal 10 that includes one embodiment of a universal receptacle faceplate assembly 25 shown with an optional access door. The power pedestal 10 has multiple ports that yield access to utilities such as power, cable, phone, internet, water, and sewage. For example, the valves 22 provide fresh water. In addition to access to fresh water, the power pedestal 10 provides access to media. Access unit 23 may provide access to a circuit breaker, cable jacks, phone jacks, and/or internet jacks. Hubs 24 are used to pump out the sewage from a head or the accumulated liquid in a bilge.

As will be described in more detail below, one or more power receptacles are housed in the universal receptacle faceplate assembly 25. The power receptacles provide access to electrical infrastructure. The receptacles housed in the universal receptacle faceplate assembly 25 can be changed to accommodate varying amperage needs. The power pedestal 10 also has a pedestal cover 30 with light lenses 32. The light lenses 32 let light escape from the interior of the power pedestal 10 to light the area.

Figure 1B:
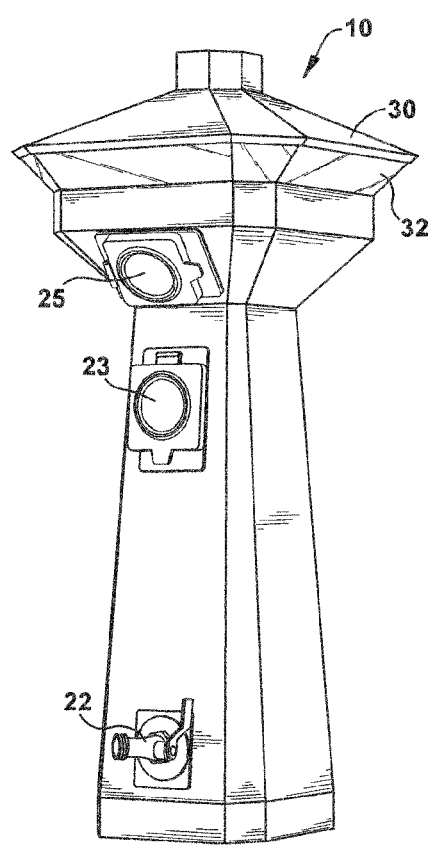
FIG. 1B is a schematic illustration of a marina power pedestal that includes one embodiment of a universal receptacle faceplate assembly.

FIG. 1B illustrates an embodiment of a power pedestal 10 that includes similar features as the power pedestal 10 of FIG. 1A, In one embodiment of a universal receptacle faceplate assembly 25 shown with an optional cover. For protection from environmental contaminants (e.g., particulates, precipitates, insects), the universal receptacle faceplate assembly 25 may be aligned at an acute angle with the ground.

Figure 2:
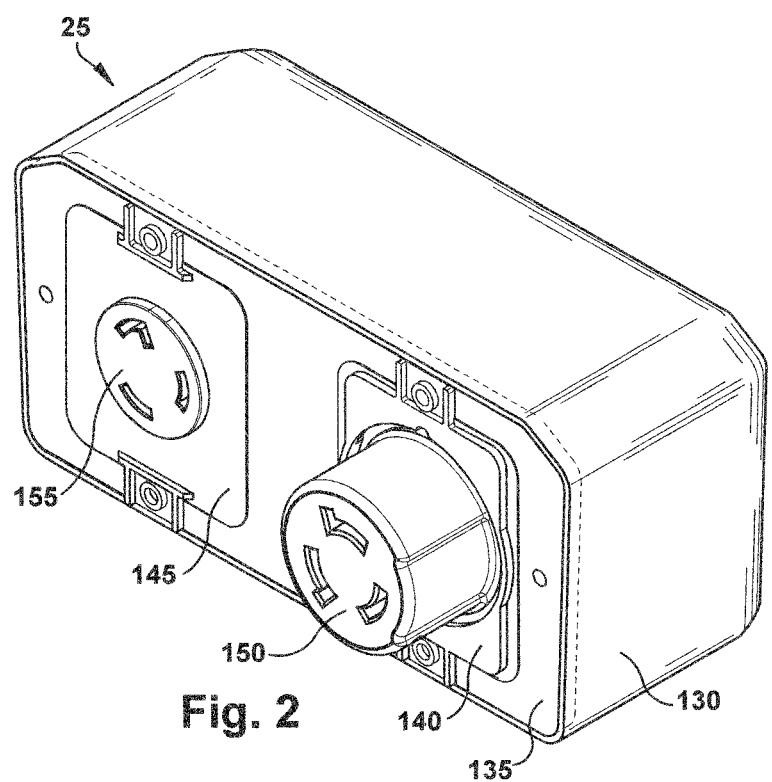
FIG. 2 is a schematic illustration of an embodiment of a universal receptacle faceplate assembly.

FIG. 2 shows a universal receptacle faceplate assembly 25. The universal receptacle faceplate assembly 25 is assembled to an enclosure 130. The enclosure 130 is configured to be installed in the power pedestal and will house wiring that provides electricity to receptacles in the enclosure. The enclosure 130 includes a faceplate 135. The enclosure 130 encloses a first power receptacle 150 and a second power receptacle 155. The first power receptacle 150 is covered by a first cover 140. The second power receptacle 155 is covered by a second cover 145. The first cover 140 and the second cover 145 are configured differently to accommodate the different shapes of the first power receptacle 150 and the second power receptacle 155.

FIG. 3 shows an exploded view of one embodiment of a universal receptacle faceplate assembly 25. The components of the universal receptacle faceplate assembly 25 include the enclosure 130, the faceplate 135, the first receptacle 150, the first cover 140, the second receptacle 155, and the second cover 145. The enclosure 130 houses the receptacles 150, 155 and their associated wiring. The faceplate 135 is mounted in the interior portion 131 of the enclosure 130. The faceplate 135 is mounted to a set of enclosure tabs 132, 133, 134, 136, 137, 138 in the interior portion 131 of the enclosure 130. The set of enclosure tabs have corresponding holes that align with holes on the faceplate 135. For example, the enclosure tab 132 has an enclosure hole 239d. The enclosure hole 239d is aligned with a faceplate hole 239c in the faceplate 135 such that a fastener (e.g., rod, screw, nail, bolt) can be used to attach the faceplate 135 to the enclosure 130 by passing through both the faceplate hole 239c and the enclosure hole 239d in the enclosure tab 132.

Four points of contact between the enclosure 130 and the faceplate 135 are shown by virtue of the faceplate notches and corresponding enclosure tabs and enclosure holes. Additionally, two points of contact between the enclosure 130 and the faceplate 135 are made by virtue of enclosure tabs 134 and 138. Faceplate hole 232a in the faceplate 135 corresponds to enclosure hole 232b in enclosure tab 138. Faceplate hole 234a in the faceplate 135 corresponds to enclosure hole 234b in enclosure tab 134.

More or fewer contact points could be used to attach the faceplate 135 to the enclosure 130. The set of tabs may be machined or molded as a part of the enclosure 130 or affixed to the interior portion 131 of the enclosure 130 with a fastening agent (e.g., adhesive, glue, clamps, latches). The placement of the tabs in the interior portion 131 of the enclosure may be based on the design of the enclosure 130, the faceplate 135, or any combination of parts of the universal receptacle faceplate assembly 25. Should the position of the tabs be changed, the position of the holes in the corresponding parts of the universal receptacle faceplate assembly 25 can be changed such that the holes of the various parts maintain alignment.

The faceplate 135 is configured to be fit with receptacles. Accordingly, the openings 235, 237 in the faceplate are shaped to accommodate either a first receptacle 150 or a second receptacle 155. The openings 235, 237 are sized to accommodate receptacles of all types (e.g., 20 A, 30 A, 50 A) so that the same faceplate may be used regardless of the types of receptacles that are installed in the enclosure 130. The same tab and corresponding holes system described above is used to attach the first receptacle 150 and the second receptacle 155 to the faceplate 135. Specifically, the faceplate is configured with a set of notches 236a, 236b, 238a, 238b. The notches 236a, 236b in the faceplate 135 correspond to a set of tabs 157, 158, respectively, affixed to the first receptacle 150. The notches 238a, 238b in the faceplate 135 correspond to a set of tabs 159, 160, respectively, affixed to the second receptacle 155.

The first receptacle 150 is configured with a receptacle tab 157. The receptacle tab 157 corresponds to the faceplate notch 236a in the faceplate 135. The receptacle tab 157 is configured to nest within the faceplate notch 236a such that the tab 157 is flush with the faceplate 135 when the tab 157 is seated in the faceplate notch 236a. The receptacle tab 157 has a receptacle hole 259b. The receptacle hole 259b corresponds to the faceplate hole 259c and the enclosure hole 259d. Thus, the first receptacle 150 can be affixed to the faceplate 135 and the enclosure 130 using one fastener. The first receptacle 150 is also configured with a receptacle tab 158 corresponding to a faceplate notch 236b. The receptacle tab 158 has a receptacle hole 239b that is aligned with the faceplate hole 239c in the faceplate notch 236b and the enclosure hole 239d in the enclosure tab 132.

The second receptacle 155 is configured with a receptacle tab 159. The receptacle tab 159 corresponds to a faceplate notch 238a. The receptacle tab 159 is configured to nest within the faceplate notch 238a. The receptacle tab 159 has a receptacle hole 261b. The receptacle hole 261b corresponds to the faceplate hole 261c and the enclosure hole 261d. The second receptacle 155, the faceplate 135, and the enclosure 130 can be assembled by passing a fastener through the corresponding receptacle hole 261b, the faceplate hole 261c, and the enclosure hole 261d. The second receptacle 155 is also configured with a receptacle tab 160 corresponding to a faceplate notch 238b. The receptacle tab 160 has a receptacle hole 241b that corresponds to the faceplate hole 241c in the faceplate notch 238b and the enclosure hole 241d in the enclosure tab 132.

Four contact points are illustrated between the first receptacle 150, the second receptacle 155, and the faceplate 135. However, more or fewer contact points could be used to attach the first receptacle 150 and the second receptacle 155 to the faceplate 135. The set of tabs on the receptacles 150 and 155 may be formed as a part of receptacles 150 and 155 or affixed after manufacture with a fastening agent (e.g., adhesive, glue, clamps, latches).

The first receptacle 150 is a 50 A receptacle and the second receptacle 155 is a 30 A receptacle. The universal receptacle faceplate assembly 25 is capable of accommodating receptacles of different amperages. The first receptacle 150 and the second receptacle 155 are shaped differently and have different sizes. Accordingly, the tabs on the receptacles 150 and 155 may be adapted so that they properly mate with the faceplate notches.

A cover is chosen to fit the receptacle that the cover surrounds. The first cover 140 is specifically configured to closely surround 30 amp receptacle 150. The second cover 145 is specifically configured to closely surround a 20 amp receptacle 155. The covers 140 and 145 are attached using the same tab and hole system that the receptacles 150 and 155, the faceplate 135, and the enclosure 130 use. For example, the first cover 140 is configured to fit over the first receptacle 150. The first cover 140 has a first cover tab 271. The first cover tab 271 corresponds to the receptacle tab 157. The first cover tab 271 has a cover hole 259a that corresponds to the receptacle hole 259b, the faceplate hole 259c, and the enclosure hole 259d. Thus, the first cover 140, the first receptacle 150, the faceplate 135, and the enclosure 130 can be attached by passing a fastener through the corresponding holes 259a, 259b, 259c, and 259d.

The first cover 140 is configured with a second cover tab 272 having a cover hole 239a. The second cover tab 272 corresponds to the receptacle tab 153 having the receptacle hole 239b. Therefore, the first cover 140, the first receptacle 150, the faceplate 135, and the enclosure 130 can be attached by passing a fastener through the corresponding holes 239a, 239b, 239c, and 239d. While two contact points are shown between the cover 140 and the receptacle 150, more or fewer may be used.

The second cover 145 is configured to fit over the second receptacle 155. The second cover 145 has a first cover tab 273. The first cover tab 273 corresponds to the receptacle tab 159. The first cover tab 273 of the second cover 145 has a cover hole 261a that corresponds to the receptacle hole 261b, the faceplate hole 261c, and the enclosure hole 261d. Thus, the second cover 145, the second receptacle 155, the faceplate 135, and the enclosure 130 can be attached by passing a fastener through the corresponding holes 261a, 261b, 261c, and 261d.

The second cover 145 also has a second cover tab 274. The second cover tab 274 has a cover hole 241a corresponding to the receptacle hole 241b of the second receptacle 155, the faceplate hole 241c, and the enclosure hole 241d. A fastener attaches the second cover 145 to the second receptacle 155, the faceplate 135, and the enclosure 130 by passing through the corresponding holes 241a, 241b, 241c, and 241d. As can be seen in FIG. 3, the faceplate 135 can fit receptacle/covers of various amperages in either opening 235, 237.

For example, the first receptacle 150 and the first cover 140 could be installed in the opening 235 and the second receptacle 155 and the second cover 145 could be installed in the opening 237.

FIG. 4A is a rear perspective view of one embodiment of the first cover 140. The first cover 140 has an opening 141 to allow a 50 A receptacle, such as receptacle 150 (not shown) to pass through the first cover 140. The size and shape of the opening 141 are determined by the size and shape of the 50 A receptacle. The first cover 140 has flanges 440 and 445. The flanges 440 and 445 do not extend around the area of the first cover 140 where the cover tabs 271, 272 because the cover tabs 271, 272 are configured to be seated into tabs of a receptacle, such as tabs 157, 158 (not shown).

With reference to FIG. 4B, the first cover tab 271 is configured with the cover hole 259a and the second cover tab 272 is configured with the cover hole 239a. FIG. 4C is a cross section view of the first cover 140.

FIG. 5A is a rear perspective view of one embodiment of the second cover 145. The second cover 145 has an opening 147 to allow a 30 A receptacle, such as receptacle 155 (not shown) to pass through the second cover 145. The size and shape of the opening 147 are determined by the size and shape of the 30 A receptacle. The second cover 145 has flanges 540 and 545. The flanges 540 and 545 do not extend around the area of the second cover 145 where the cover tabs 273, 274 because the cover tabs 273, 274 are configured to be seated into tabs of a receptacle, such as tabs 159, 160 (not shown).

Figure 6A:
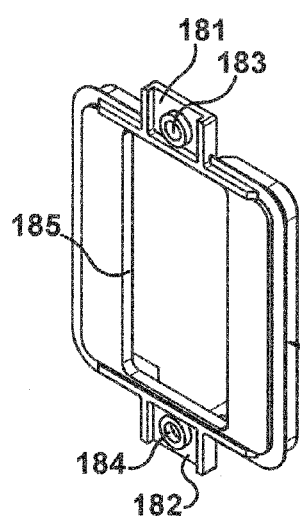
FIG. 6A is a perspective view of one embodiment of a faceplate cover.

With reference to FIG. 5B, the first cover tab 273 is configured with the cover hole 261a and the second cover tab 274 is configured with the cover hole 241a. FIG. 5C is a cross section view of the second cover 145, FIG. 6A is a front perspective view of one embodiment of a cover 180. The cover 180 has an opening 185 to allow a rectangular receptacle (not shown) to pass through the cover 180. The size and shape of the opening 185 are determined by the size and shape of the receptacle. The cover 180 has a first cover tab 181 and a second cover tab 182. The first cover tab 181 is configured with a first cover hole 183. The second cover tab 182 is configured with a second cover hole 184. The cover holes 183, 184 correspond to holes on the receptacle. In this manner the cover 180 can be affixed to the receptacle.

Figure 6B:
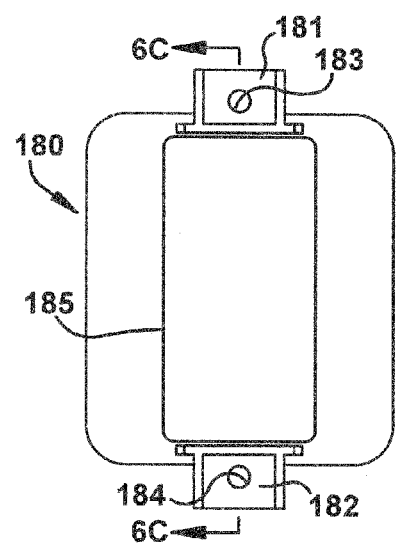
FIG. 6B is a front view of one embodiment of a faceplate cover.
Figure 6C:
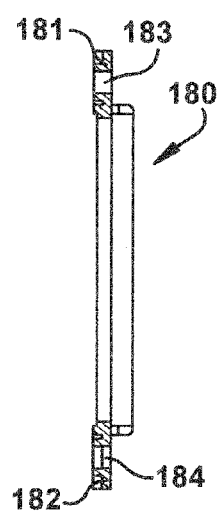
FIG. 6C is a cross section view of one embodiment of a faceplate cover.

With reference to FIG. 6B, the first cover tab 181 is configured with the cover hole 183 and the second cover tab 182 is configured with the cover hole 184. FIG. 6C is a cross section view of the cover 180.

Figure 7A:
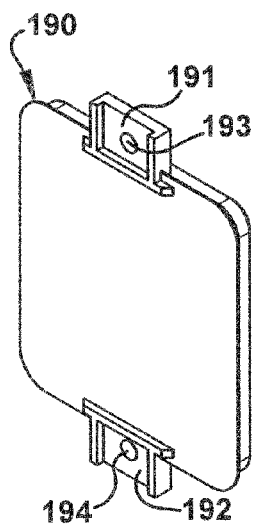
FIG. 7A is a perspective view of one embodiment of a faceplate cover.

FIG. 7A is a front perspective view of one embodiment of a cover 180. The cover 190 does not have an opening. Cover 190 protects the wiring in a power pedestal when a receptacle is not installed The cover 190 has a first cover tab 191 and a second cover tab 192. The first cover tab 191 is configured with a first cover hole 193. The second cover tab 192 is configured with a second cover hole 194. The cover holes 193, 194 correspond to holes on the faceplate (not shown). In this manner the cover 190 can be affixed to the faceplate.

Figure 7B:
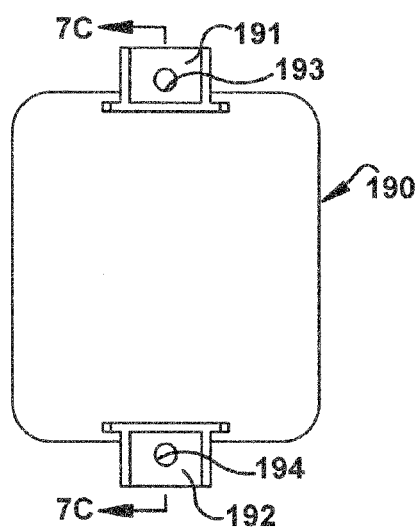
FIG. 7B is a front view of one embodiment of a faceplate cover.
Figure 7C:
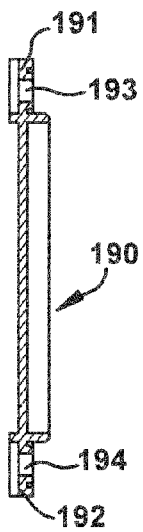
FIG. 7C is a cross section view of one embodiment of a faceplate cover.

With reference to FIG. 7B, the first cover tab 191 is configured with the cover hole 193 and the second cover tab 192 is configured with the cover hole 194. FIG. 7C is a cross section view of the cover 190.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d, Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A faceplate assembly, comprising:
a substantially planar plate base configured to mount on a wiring enclosure;
a first faceplate opening in the plate base configured to receive a first receptacle of a first receptacle type;
a second faceplate opening in the plate base configured to receive a second receptacle of a second receptacle type different than the first receptacle type;
a first faceplate notch in a front surface of the plate base configured to receive a first receptacle tab disposed on said first receptacle, where the first receptacle tab is configured to allow a first fastener to pass through the first faceplate notch and the first receptacle tab to attach the first receptacle to the faceplate;
a second faceplate notch in a front surface of the plate base configured to receive a second receptacle tab disposed on said second receptacle, where the second receptacle tab is configured to allow a second fastener to pass through the second faceplate notch and the second receptacle tab to attach the second receptacle to the faceplate, the second faceplate notch being spaced from the first faceplate notch;
a first cover having a first cover opening configured to allow the first receptacle to extend through the first cover; and
a second cover having a second cover opening configured to allow the second receptacle to extend through the second cover,
where the first cover includes a first cover tab configured to allow the first fastener to pass through the first faceplate notch, the first receptacle tab, and the first cover tab to attach the first receptacle and the first cover to the faceplate, and
where the second cover includes a second cover tab configured to allow the second fastener to pass through the second faceplate notch, the second receptacle tab, and the second cover tab to attach the second receptacle and the second cover to the faceplate.

2. The faceplate assembly of claim 1, where each of the first faceplate notch and the second faceplate notch is depressed into the front surface of the faceplate, where the first receptacle tab is configured to be flush with the front surface of the faceplate when the first receptacle tab is seated in the first faceplate notch, and where the second receptacle tab is configured to be flush with the front surface of the faceplate when the second receptacle tab is seated in the second faceplate notch.

3. The faceplate assembly of claim 1, where the first receptacle type is one of a 20 amperage, 30 amperage, or a 50 amperage, and where the different second receptacle type is a different one of the 20 amperage, 30 amperage, or the 50 amperage.

4. The faceplate assembly of claim 1, where the first faceplate opening is spaced from the second faceplate opening, and where the first cover is spaced from the second cover.

5. The faceplate assembly of claim 1, where the first cover comprises a first circular-shaped edge defining the first cover opening, where the first circular-shaped edge has a first diameter, where the second cover comprises a second circular-shaped edge defining the second cover opening, and where the second circular-shaped edge has a second diameter larger than the first diameter.

6. The faceplate assembly of claim 1, where the first cover comprises a first inward flange disposed proximate a periphery of the first cover, where the first inward flange does not extend around the first cover tab, where the second cover comprises a second inward flange disposed proximate a periphery of the second cover, and where the second inward flange does not extend around the second cover tab.

7. The faceplate assembly of claim 6, where the first cover further comprises a first base flange disposed proximate the periphery of the first cover, where the first base flange does not extend around the first cover tab, where the first base flange is disposed generally normal to the first inward flange, where the second cover further comprises a second base flange disposed proximate the periphery of the second cover, where the second base flange does not extend around the second cover tab, and where the second base flange is disposed generally normal to the second inward flange.

8. A faceplate assembly, comprising:
a substantially planar plate base configured to mount on a wiring enclosure;
a first faceplate opening in the plate base configured to receive a first receptacle of a first receptacle type;

a second faceplate opening in the plate base configured to receive a second receptacle of a second receptacle type different than the first receptacle type;

a first faceplate notch in a front surface of the plate base configured to receive a first receptacle tab disposed on the first receptacle, where the first receptacle tab is configured to allow a first fastener to pass through the first faceplate notch and the first receptacle tab to attach the first receptacle to the faceplate;

a second faceplate notch in a front surface of the plate base configured to receive a second receptacle tab disposed on the second receptacle, where the second receptacle tab is configured to allow a second fastener to pass through the second faceplate notch and the second receptacle tab to attach the second receptacle to the faceplate, the second faceplate notch being spaced from the first faceplate notch;

the first receptacle of the first receptacle type having the first receptacle tab installed in the first faceplate notch;

the second receptacle of the second receptacle type having the second receptacle tab installed in the second faceplate notch;

a first cover with a first cover tab, where the first cover tab is installed in the first faceplate notch; and a second cover with a second cover tab, where the second cover tab is installed in the second faceplate notch;

the first fastener configured to pass through the first faceplate notch, the first receptacle tab, and the first cover tab to attach the first receptacle and the first cover to the faceplate; and the second fastener configured to pass through the second faceplate notch, the second receptacle tab, and the second cover tab to attach the second receptacle and the second cover to the faceplate.

9. The faceplate assembly of claim 8, where each of the first fastener and the second fastener is selected from the group consisting of a screw, a nail, or a bolt.

10. An electrical enclosure assembly, comprising:

an enclosure configured to house a first receptacle of a first receptacle type, a second receptacle of a second receptacle type different than the first receptacle type, and associated wiring, the enclosure having a first enclosure tab and a second enclosure tab;

a faceplate having a plate base with a front surface, a first faceplate opening configured to receive the first receptacle, a second faceplate opening configured to receive the second receptacle, a first faceplate notch with a first faceplate notch hole, and a second faceplate notch with a second faceplate notch hole, where the first faceplate notch is configured to align with a first receptacle tab disposed on the first receptacle, where the first receptacle tab has a first receptacle hole, where the second faceplate notch is configured to align with a second receptacle tab disposed on the second receptacle, where the second faceplate notch is spaced from the first faceplate notch, and where the second receptacle tab has a second receptacle hole;

a first cover having a first cover tab with a first cover hole, where the first cover is configured to be seated over the first receptacle;

a second cover having a second cover tab with a second cover hole, where the second cover is configured to be seated over the second receptacle;

a first fastener configured to couple the faceplate, the first receptacle, the enclosure, and the first cover by passing through the first faceplate notch hole, the first receptacle tab, the first enclosure tab, and the first cover tab; and a second fastener configured to couple the faceplate, the second receptacle, the enclosure, and the second cover by passing through the second faceplate notch hole, the second receptacle tab, the second enclosure tab, and the second cover tab.

11. The electrical enclosure assembly of claim 10, where each of the first faceplate notch and the second faceplate notch is depressed into the faceplate, where the first receptacle tab is configured to be flush with the faceplate when the first receptacle tab is seated in the first faceplate notch, and where the second receptacle tab is configured to be flush with the faceplate when the second receptacle tab is seated in the second faceplate notch.

12. The electrical enclosure assembly of claim 10, where the faceplate is configured to receive a 20 amperage receptacle, 30 amperage receptacle, and 50 amperage receptacle.

13. The electrical enclosure assembly of claim 10, where each of the first cover and the second cover is configured to fit a specific amperage of receptacle.

14. The electrical enclosure assembly of claim 10, where the first cover comprises a first inward flange disposed proximate a periphery of the first cover, where the first inward flange does not extend around the first cover tab, where the second cover comprises a second inward flange disposed proximate a periphery of the second cover, and where the second inward flange does not extend around the second cover tab.

15. The electrical enclosure assembly of claim 10, where the first faceplate opening is spaced from the second faceplate opening, and where the first cover is spaced from the second cover.

16. An electrical enclosure assembly, comprising:

an enclosure configured to house a first receptacle of a first receptacle type, a second receptacle of a second receptacle type, and associated wiring, the enclosure comprising a first enclosure tab and a second enclosure tab, the first enclosure tab having a first enclosure hole, the second enclosure tab having a second enclosure hole;

a faceplate having a plate base with a front surface, a first faceplate opening configured to receive the first receptacle, a second faceplate opening configured to receive the second receptacle, first faceplate notch with a first faceplate notch hole, and a second faceplate notch with a second faceplate notch hole, where the first faceplate notch is configured to align with a first receptacle tab disposed on the first receptacle, where the first receptacle tab has a first receptacle hole, where the second faceplate notch is configured to align with a second receptacle tab disposed on the second receptacle, where the second faceplate notch is spaced from the first faceplate notch, and where the second receptacle tab has a second receptacle hole;

a first cover having a first cover tab with a first cover hole, where the first cover is configured to be seated over the first receptacle;

a second cover having a second cover tab with a second cover hole, where the second cover is configured to be seated over the second receptacle;

a first fastener configured to couple the faceplate, the first receptacle, the enclosure, and the first cover by passing through the first faceplate notch hole, the first receptacle tab, the first enclosure tab, and the first cover tab, and a second fastener configured to couple the faceplate, the second receptacle, the enclosure, and the second cover by passing through the second faceplate notch hole, the second receptacle tab, the second enclosure tab, and the second cover tab, where the first faceplate notch is configured to align with the first enclosure tab, and where the second faceplate notch is configured to align with the second enclosure tab.

17. The electrical enclosure assembly of claim 16, where the first fastener is configured to couple the faceplate to the enclosure by passing through the first faceplate notch hole and the first enclosure tab hole, and where the second fastener is configured to couple the faceplate to the enclosure by passing through the second faceplate notch hole and the second enclosure tab hole.

18. The electrical enclosure assembly of claim 16, where each of the first enclosure tab and the second enclosure tab is machined to the enclosure or affixed to the enclosure with the fastening agent.

19. A universal receptacle faceplate assembly kit, comprising:

a faceplate comprising:

a substantially planar plate base configured to mount on a wiring enclosure;

a first faceplate opening in the plate base configured to receive a first receptacle of a first receptacle type;

a second faceplate opening in the plate base configured to receive a second receptacle of a second receptacle type different than the first receptacle type, the second faceplate notch being spaced from the first faceplate notch;

a first faceplate notch in a front surface of the plate base configured to receive a first receptacle tab disposed on the first receptacle;

a second faceplate notch in a front surface of the plate base configured to receive a second receptacle tab disposed on the second receptacle;

a set of covers, comprising a first cover and a second cover, where the first cover includes a first cover tab, where the first cover is configured to surround the first receptacle, where the second cover includes a second cover tab, and where the second cover is configured to surround the second receptacle;

a first fastener configured to couple the faceplate, the first receptacle, and the first cover by passing through the first faceplate notch, the first receptacle tab, and the first cover tab; and a second fastener configured to couple the faceplate, the second receptacle, and the second cover by passing through the second faceplate notch, the second receptacle tab, and the second cover tab.

20. The universal receptacle faceplate assembly kit of claim 19, where the first cover is configured to receive a 20 amperage receptacle, where the second cover is configured to receive a 30 amperage receptacle, and where the set of covers further comprises a third cover configured to receive a 50 amperage receptacle.

* * * * *